United States Patent [19]
Nishimura

[11] Patent Number: 5,748,482
[45] Date of Patent: May 5, 1998

[54] APPARATUS FOR PRODUCING AN OBJECT HAVING AN ASPHERICAL SURFACE AND METHOD OF OPERATION THEREOF

[75] Inventor: Takashi Nishimura, Mito, Japan

[73] Assignees: Hitachi, Ltd.; Hitachi Koki Co., Ltd., both of Tokyo, Japan

[21] Appl. No.: 684,342

[22] Filed: Jul. 19, 1996

[30] Foreign Application Priority Data

Jul. 25, 1995 [JP] Japan .................. 7-189401

[51] Int. Cl.$^6$ .................. G06F 19/00; B24B 49/00
[52] U.S. Cl. .................. 364/474.06; 451/5; 451/42
[58] Field of Search .......... 364/474.06, 474.14–474.17, 364/474.21, 474.35; 451/1, 9, 5, 11, 27, 42, 143, 211, 256

[56] References Cited

U.S. PATENT DOCUMENTS

| | | | |
|---|---|---|---|
| 5,107,628 | 4/1992 | Kondo et al. | 451/42 |
| 5,411,430 | 5/1995 | Nishimura et al. | 451/1 |
| 5,477,118 | 12/1995 | Yoneda et al. | 364/474.17 |

FOREIGN PATENT DOCUMENTS

| | | |
|---|---|---|
| 48-49315 | 7/1973 | Japan . |
| 48-98844 | 12/1973 | Japan . |
| 62-203744 | 9/1987 | Japan .......... B24B 13/00 |

*Primary Examiner*—Paul P. Gordon
*Assistant Examiner*—Steven R. Garland
*Attorney, Agent, or Firm*—Antonelli, Terry, Stout, & Kraus, LLP

[57] ABSTRACT

An apparatus, for producing an object having an asymmetric and aspherical surface, includes a rotary table on which a workpiece is attached at a peripheral part, the rotating table rotating on a rotation shaft, a rectilinear motion table for moving the rotating table in one direction, a grind unit for grinding the workpiece using a grinding part supported by a spindle movable in a sub-scanning direction of the workpiece and contacting the workpiece, a support arm for swinging the grinding part together with the spindle with a circular arc motion in the sub-scanning direction of the workpiece, a data storage unit for storing data which prescribes a target shape of the workpiece, a shape measurement unit for measuring the shape of the workpiece attached at the rotary table, and a control unit for controlling the above-described mechanisms and units. The control unit compares date, measured by the shape measurement unit, of a shape of the workpiece which is being ground, with the stored data prescribing the target shape of the workpiece, and controls grinding of the workpiece so that the measured shape of the workpiece conforms to the shape prescribed by the stored data, based on results of the comparison.

15 Claims, 7 Drawing Sheets

APPARATUS FOR PRODUCING AN OBJECT HAVING AN ASPHERICAL SURFACE AND METHOD OF OPERATION THEREOF

BACKGROUND OF THE INVENTION

The present invention relates to an apparatus for producing an object having an aspherical surface, especially to an apparatus for processing a surface of an object so that the surface is a deformed toroidal surface or a deformed concave toroidal surface in which the radius of the surface in a sub-scanning axis direction changes depending on the position in the surface.

Further, the apparatus for producing an object having an aspherical surface is preferably used for processing an optical lens.

Generally, in producing an optical lens, optical glass is often used, and mechanical processing, such as grinding, is performed for producing the optical lens.

A device for producing an optical toroidal lens is disclosed in JP-A-203744/1987. In this device, at first, a grinding tool, having a surface shape which is complementary to a toroidal surface to be processed, is prepared. Then, by biasing the grinding tool against a piece of optical glass and grinding the piece of optical glass with the grinding tool, while feeding fluid including a fine abrasive into a gap between the piece of optical glass and the grinding tool, a toroidal lens having a desired toroidal surface is produced.

Although it is possible to produce a toroidal lens having a toroidal surface by using the above-mentioned device disclosed in JP-A-203744, the surface shape of the resulting lens is only a simple toroidal shape, and an asymmetrical and aspherical lens can not be produced using this device.

Recently, in an apparatus including an optical system, such as a camera, a laser printer, and so forth, an aspherical lens has been extensively used for the optical 10 system. Particularly, in an optical system of a laser printer, the direction of a laser beam is deflected and a drum conductor is scanned with the laser beam by using an optical system in which an existing Fθ lens is combined with a polygon mirror. However, the reflection surface of the polygon mirror declines in the deflection and scanning of a laser beam, which causes a problem of irregularity in the scanning pitches of the laser beam.

Several methods of solving the above-mentioned problem have been devised. One of them is disclosed in JP-A-98844/1973, wherein errors in the laser beam scanning, caused by a decline of a polygon mirror, is reduced by using a spherical lens combined with a cylindrical lens. Another solution is disclosed in JP-A-49315/1973, wherein errors in the laser beam scanning, caused by the decline of a polygon 25 mirror, are reduced by using a toroidal lens combined with a cylindrical lens. Although these methods are effective to reduce the errors caused by the decline of the polygon mirror, the method causes a new problem in that the number of parts is large, since a Fθ lens system uses two or more types of optical parts, including a cylindrical lens, a toroidal lens and a spherical lens.

A method of changing the radius of curvature in a facet tilt direction (sub-scanning direction) of a Fθ lens, depending on the direction of the facet tilt, also has been devised. In this method, the aberration of a lens can be reduced by processing a Fθ lens so as to have an asymmetrical and aspherical surface such that the radius of curvature in the facet tilt direction (sub-scanning direction) increases as the facet tilt direction becomes more distant from the optical axis.

A lens having an asymmetrical and aspherical surface, as mentioned above, has many excellent optical properties. However, since the shape of the asymmetrical and aspherical surface is very complicated, existing grind-processing methods can not form a lens having such a complicated shape. Therefore, it is necessary to apply a numerical control method (NC) to grind-processing of a lens having an asymmetrical and aspherical surface.

Although it is possible to produce an aspherical lens having a surface of an arbitrary shape using grind-processing in which numerical control is applied, the processing time is long, which increases the cost of lens production, and decreases the performance for mass-production.

In order to solve the above-mentioned problems, an aspherical lens processing method using a molding method has been devised. By using this molding method, it is possible to mass-produce cheap aspherical lenses having an excellent optical property, since plural lenses of the same shape can be produced with one die.

There are two kinds of molding methods, that is, a glass molding method and a plastic molding method. In the glass molding method, at first, a die of a prescribed shape is formed with high accuracy. Then, a glass object of the prescribed shape is obtained by transferring the shape of an inside surface of the die to glass material by forcing and compressing a lump of softened glass into the die. On the other hand, the plastic molding method may be performed in three ways, that is, a press molding method, an injection molding method and an injection and compression molding method. The press molding method transfers a shape of an inside surface of a die to plastic material (glass material) by compressing a lump of blank material into the die. In the injection molding method, plasticized resin (glass material) is injected into the die at a pressure of 700–1000 kg/cm² and fills the die, the temperature of which is increased to about the glass transition temperature, and the injected and formed resin then is cooled and taken out from the die. The injection and compression molding method fills a die with plasticized resin (glass material), and compresses the plasticized resin at a pressure of 1000–1600 kg/cm² while preventing a back flow of the resin After the resin is cooled, the formed resin (glass material) is taken out from the die. In these molding methods, since the shape of an inside surface of a die is transferred to a facing surface of formed plastic (glass material) as it is, the size accuracy of the surface shape and the roughness of an inside surface of the die greatly affects the finish accuracy of the formed plastic. Therefore, in the molding method, it is important to process a desired shape of an inside surface of a die with high size accuracy.

Most shapes of an inside surface of a die applicable to the existing molding methods are flat or spherical. Even when the surface shape of a die is aspherical the lens processed by such a die is a lens having a symmetrical and aspherical surface, such as used for a single-lens reflex camera. Thus, it is difficult to produce a lens having an asymmetric and aspherical concave surface by using the existing molding methods employing a die. That is, since some restrictions exist with regard to the presently available die used for the molding methods, these molding methods can not be applied to produce an asymmetrical and aspherical lens, although the molding method is applicable to producing a symmetrical and aspherical lens. Naturally, the molding methods can not mass-produce asymmetrical and aspherical lenses at all.

SUMMARY OF THE INVENTION

The present invention has been developed in consideration of the above-described problems, and the object of the invention is to provide an apparatus for producing an object having an asymmetric and aspherical concave surface with a high size accuracy.

In order to attain the above-mentioned object, the present invention provides an apparatus for producing an object having an asymmetric end aspherical surface, the apparatus having a rotary mechanism to which a workpiece is attached on a peripheral part rotating on a rotation shaft, a rectilinear motion mechanism for moving the rotating mechanism in one direction, a grinding mechanism for grinding the workpiece with a grinding part supported by a spindle movable in a sub-scanning direction of the workpiece and contacting the workpiece, a swing mechanism for swinging the grinding part together with the spindle in a circular arc in the sub-scanning direction of the workpiece, a date storage unit for storing date which prescribes a target surface shape of the workpiece, a shape measurement unit for measuring a surface shape of the workpiece attached at the rotary mechanism, and a control unit for controlling the above-described mechanisms and units, wherein the control unit compares data measured by the shape measurement unit, concerning a surface shape of the workpiece which is being ground, with the stored date prescribing the target surface shape of the workpiece, and controls grinding of the surface of the workpiece so that the measured surface shape of the workpiece conforms to the target surface shape prescribed by the stored data, based on results of the comparison.

The above-mentioned control unit rotates the rotary mechanism on which the workpiece is attached, and biases the grinding part into contact with the workpiece which is being processed by the grinding part. The amount of material removed at each position on a ground surface of the workpiece is set by the control unit, based on the data prescribing the target surface shape of the workpiece, which data is stored in the data storage unit. Thus, the ground surface of the workpiece is processed so as to become an aspherical surface prescribed by the stored data. In this processing, the control unit controls the shape measurement unit to measure the sizes of the ground surface, and compares the measured sizes and the stored data. Further, if the control unit judges that a difference between the measured sizes and the prescribed sizes at each part of the ground surface is larger than a definite amount, the control unit controls the grinding process of the workpiece by using new grind control data such that the measured shape of the workpiece approaches nearer to the shape prescribed by the stored data.

As mentioned above, the present invention can control the grinding of a surface of a workpiece so that the ground surface has an asymmetrical and aspherical concave surface, that is, a deformed toroidal shape slightly deviating from a toroidal shape, which makes possible mass-production of objects having an asymmetrical and aspherical concave surface with a high size accuracy.

BRIEF DESCRIPTION OF THE DRAWINGS

FIG. 1b is a perspective view of a portion of the apparatus of FIG. 1a.

DETAILED DESCRIPTION OF A PREFERRED EMBODIMENT

Figure 1A:
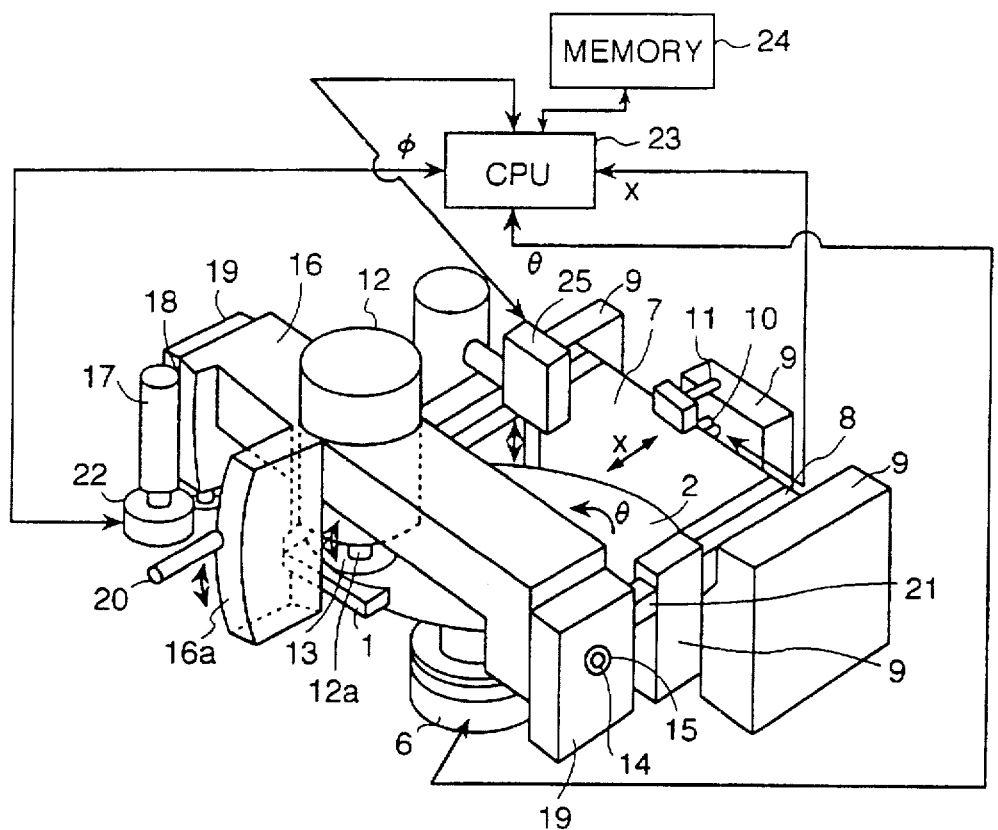
FIG. 1a is a perspective view showing the composition of an apparatus for producing an object having an aspherical surface according to an embodiment of the present invention.

Hereinafter, a preferred embodiment of the present invention will be explained by referring to the drawings.

Figure 1B:
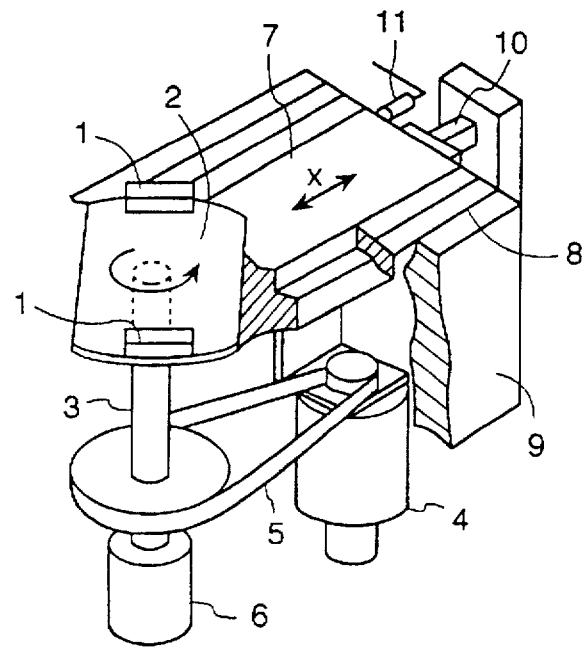

FIG. 1a is a perspective view showing an apparatus for producing an object having an aspherical surface, in accordance with the present invention, and FIG. 1b is a partial view of a grinding mechanism in the apparatus of FIG. 1a.

As shown in FIGS. 1a and 1b, numeral 1 indicates a workpiece, and the apparatus for producing an object having an aspherical surface comprises a rotary table 2, a rotation shaft 3 for the table 2, a motor 4, a belt 5, a rotary encoder 6, a rectilinear motion table 7, a cross roller guide 8, a base 9, a first piezo-electric element 10 (piezo-actuator), a first capacitance type displacement detector 11, an air spindle 12, a spindle shaft 12a, a grinder 13 (grinding tool), a spindle supporting shaft 14, a bearing 15, a supporting arm 16, a projecting part having a circular arc surface 16a, a worm 17, a worm wheel 18, a support member 19, a second capacitance type displacement detector 20, a second piezo-electric element 21 (piezo-actuator), a pulse motor 22, a CPU 23 (control unit), a memory 24 (data storage unit), and a shape measuring instrument 25 (shape measurement unit). Further, the rotary table 2, the rotation shaft 3, the motor 4 and the belt 5 form a rotary mechanism, and the rectilinear motion table 7 and the cross roller guide 8 form a rectilinear motion mechanism. Furthermore, the air spindle 12, the spindle shaft 12a and the grinder 13 form a grinding mechanism, and the spindle supporting shaft 14, the bearing 15, the support arm 16, the worm 17 and the worm wheel 18 form a swing mechanism.

One or more workpieces are attached on a peripheral part of the rotary table 2 rotating on the rotation shaft 3, which can be slightly moved in the X direction by moving the rectilinear motion table 7. As for the rotation shaft 3, the belt 5 engaging a middle part of the rotation shaft 3 is driven by the motor 4, and the rotary encoder 6 is connected to an end part of the rotation shaft 3. The rotary table 2 is supported by an angular-contact ball bearing, and is rotated with an accuracy of about 0.1 μm in rotary deflections. The rectilinear motion table 7 is slightly movable in the X direction shown in FIG. 1a. The cross roller guide 8 is provided between the base 9 and both side parts of the rectilinear motion table 7, and the first piezoelectric element 10 is provided between the base 9 and the back end part of the rectilinear motion table 7. Further, the first capacitance type displacement detector 11 is attached to the back end part of the rectilinear motion table 7, and signals output from the detector 11 are sent to the control unit 23.

The air spindle 12, including a high frequency motor, is attached to the support arm 16 along which the air spindle can slightly move, and the grinder 13 of disc shape 13 is attached at the end of the spindle shaft 12a. The grinder 13 is rotated at a high revolution speed, for example, abut 30000 rpm, driven by the high frequency motor. The support arm 16 is swingably attached to a pair of the supporting members 19 via the spindle supporting axis 14 and the bearing 15, and can be swung in a circular arc in the sub-scanning direction of the spindle shaft 12a together with the air spindle 12, by rotation of the worm 17 engaging the worm wheel 18. The second capacitance type displacement detector 20 is arranged opposite to the circular arc surface of the projecting part 16a in the support arm 16, and signals output from the displacement detector 20 are sent to the second piezoelectric element 21 provided between the base 19 and the supporting members 9. The CPU 23 is connected to the memory 24, and the rotary encoder 6, the first piezo-electric element 10 and the pulse motor 22 are connected to the CPU 23, respectively. The shape measuring instrument 25, arranged in the vicinity of a periphery of the rotary table, measures the sizes of each part of the workpiece 1 attached on the rotary table 2.

Figure 2:
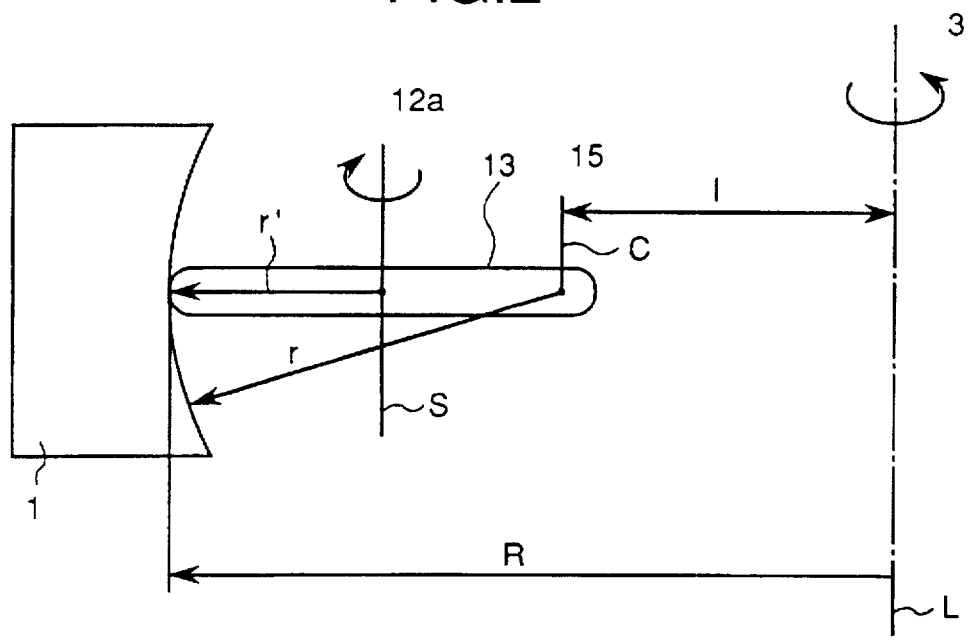
FIG. 2 is a diagram showing position relations among main parts shown in FIGS. 1a and 1b.

FIG. 2 is a diagram for showing the positional relationship among the main parts shown in FIGS. 1a and 1b, and, in the figure, the cross-sectional views of the workpiece 1, the grinder 13 and the rotation shaft 3 of the rotary table 2 are shown.

Figure 3:
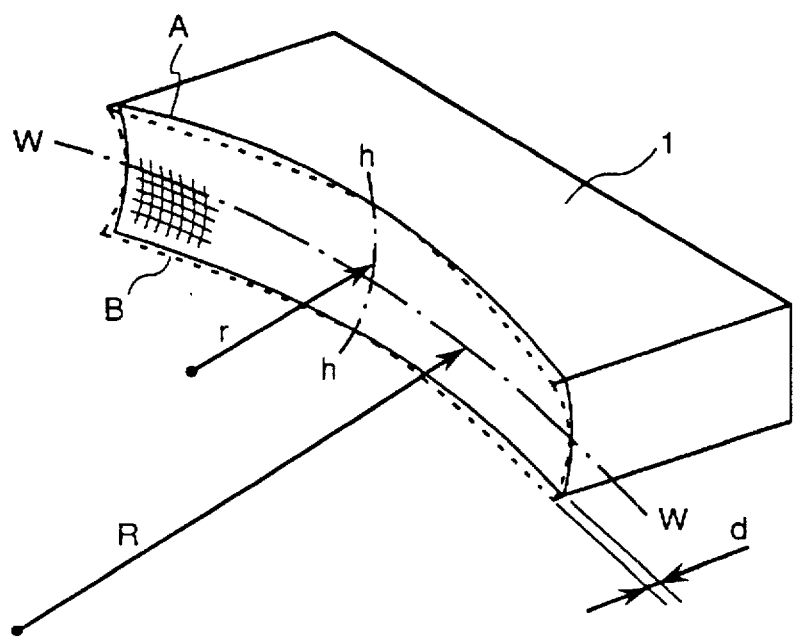
FIG. 3 is a diagram which shows an example of a ground surface of a workpiece.

FIG. 3 shows an example of a ground surface of the workpiece 1, comparing an asymmetrical and aspherical surface with a symmetrical and aspherical surface.

In FIG. 2, symbols L, C, S and R indicate the rotation central axis of the rotation shaft 3, the rotation central axis of the spindle supporting shaft 15, the rotation central axis of the spindle shaft 12a end a distance from the rotation central axis L of the rotation shaft 3 to a ground surface of the work 1 in the main axis direction, respectively. Further, symbols r and r' indicate the distance (radius) from the rotation central axis C of the spindle supporting shaft 15 to a ground surface of the work 1 and the distance (radius) from the rotation central axis S of the spindle shaft 12a, respectively. The same symbol or numeral is used to identify the same element as shown in FIG. 1a and FIG. 1b.

In FIG. 3, symbol A indicates the ground shape of an asymmetrical and aspherical surface (shown by solid lines), and symbol B indicates the ground shape of a symmetrical and aspherical surface (shown by dashed lines). The same symbol or numeral is used to identify the same element as shown in FIG. 1a and FIG. 1b.

Further, in FIGS. 2 and 3, the main axis direction of the workpiece 1 is a longitudinal direction along the line w–w' shown in FIG. 3, and the sub-scanning direction represents the height (width) direction of the workpiece 1 along the line h–h' shown in FIG. 3.

Operations of the above-mentioned apparatus for producing an object having an aspherical surface in accordance with the present invention will be explained as follows, with reference to FIGS. 1a to 3.

At first, a grinding process for forming a ground surface of a toroidal shape by using the apparatus of the present invention, such as the shape B, indicated with dashed lines in FIG. 3, will be explained.

As shown in FIGS. 2 and 3, the positions of the workpiece 1 and the rotary table 2 are adjusted so that the distance (radius) from the rotation central axis L of the rotation shaft 3 to the ground surface of the workpiece 1 in the main axis direction is equal to R, the position of the spindle shaft 12a in the air spindle 12 is adjusted so that the distance (radius) from the rotation central axis C of the spindle supporting shaft 15 to the ground surface of the workpiece 1 in the sub-scanning direction, that is, the grinding surface of the grinder 13, is equal to r. Subsequently, by driving the pulse motor 22 controlled by the CPU 23, the worm 17 linked to the pulse motor 22 is rotated to rotate the worm wheel 18. By the rotation of the worm wheel 18, the support arm 16 is moved in a circular arc on the spindle supporting shaft 14 so that the grinding surface of the grinder 13 is positioned at the grind starting point on the surface of the workpiece 1 to be ground, at the bottom point of the workpiece 1. Further, the rotary table 2 is rotated at a low revolution speed of about several rpm by driving the motor 4 under control of the CPU 23, and the grinder 13 is rotated et a high revolution speed by driving a high frequency motor included in the air spindle 12 controlled by the CPU 23, while injecting abrasive liquid to a ground part of the workpiece 1. Voltage to be fed to the first piezo-electric element 10 is controlled by the CPU 23 to move the rectilinear motion table 7 slightly in the X direction by deforming the first piezo-electric element 10. By the deformation of the first piezo-electric element 10, the grinding surface of the grinder 13 is displaced into contact with the workpiece 1, and the ground surface of the workpiece 1 is processed by the grinding surface of the grinder 13. In the grinding process, the workpiece 1 is rotated together with the rotary table 2, and one thin stripe is ground along the main axis direction on the surface of the workpiece 1 by the grinding surface of the grinder 13. After the rotary table 2 has rotated through one revolution end one thin stripe has been ground on each surface of one or more workpiece 1 attached on the rotary table 2, the worm 17 is driven to cause the worm wheel 18 to be slightly rotated by operation of the pulse motor 22 under control of the CPU 23, causing the air spindle 12 to be swung slightly upward by the rotation of the worm wheel 18, causing the air spindle to simultaneously displace the grinding surface of the grinder 13 slightly upward along the ground surface of a radium r in the sub-scanning direction, so that the grinding surface of the grinder 13 contacts a part of a surface of the workpiece 1 which has not been ground yet. The part next contacted by the grinding surface, which has not been ground yet, is a part positioned right above the thin stripe which already has been formed.

Successively, another thin stripe is ground at the part of the surface to be ground, along the main axis direction of the workpiece 1, and then, the grinding surface of the grinder 13 again contacts the next part of a surface of the workpiece 1, which has not been ground yet. The above-mentioned operations are repeated. Thus, when the grinding surface of the grinder 13 reaches the top of the surface to be ground on the workpiece 1, the ground surface having a radius of curvature r in the sub-scanning direction, that is, a toroidal surface, such as the shape B indicated by the dashed lines in FIG. 3, is formed on the workpiece 1.

In the above-mentioned grinding process, the first capacitance type displacement detector 11 continuously measures the position of the rectilinear motion table 7, and the displacement of the rectilinear motion table 7 is defected by results of the position measurement. From the detected displacement of the rectilinear motion table 7, it is confirmed that the ground surface of the workpiece 1 is being ground by a predetermined amount.

The ground surface of the workpiece 1 is a concave surface having a radius of curvature r in the sub-scanning direction. On the other hand, the grinding surface of the grinder 13 is formed to a convex surface such as shown in FIG. 3, so that the grinding surface can be used preferably for processing a concave surface.

Next, a grinding process for forming a ground surface by using the apparatus of the present invention, of a deformed toroidal shape, as shown by the shape A indicated with solid lines in FIG. 3, which differs from a toroidal surface by a deviation d, will be explained as follows.

In the grinding process, as in the grinding process for forming a ground surface of a toroidal shape, at first, the grinding starting of the grinder 13 is positioned at the grind starting point on the surface of the workpiece 1 to be ground, at the bottom point of the workpiece 1. Further, the rotary table 2 is rotated at a low revolution speed of about several rpm by driving the motor 4 under control of the CPU 23, and the grinder is rotated at a high revolution speed by driving a high frequency motor included in the air spindle 12 controlled by the CPU 23, while injecting abrasive liquid onto a ground part of the workpiece 1. The voltage to be fed to the first piezo-electric element 10 is controlled by the CPU 23 to move the rectilinear motion table 7 slightly in the X direction by deforming the first piezo-electric element 10. By the deformation of the first piezo-electric element 10, the grinding surface of the grinder 13 is caused to contact the workpiece 1, and the surface of the workpiece 1 is processed in the main axis direction by the grinding surface of the grinder 13. Each time the rotary table 2 has made one revolution, the worm 17 slightly rotates the worm wheel 18 by operation of the pulse motor 22 under control of the CPU 23, causing the air spindle 12 to be swung slightly upward by the rotation of the worm wheel 18, and the air spindle 12 swings the grinding surface of the grinder 13 slightly upward along the ground surface of a radius r in the sub-scanning direction, so that the grinding surface of the grinder 13 contacts a part of the surface of the workpiece 1 to be ground, which has not been ground yet, at a part positioned right above the already ground part.

The above-mentioned process is almost the same as the process for producing a toroidal surface. The following processing is different from that for producing a toroidal surface.

At first, a surface of the workpiece 1 to be ground is divided into many sub-areas in the main axis direction and the sub-scanning direction. Then, target surface shape data for each of the sub-areas is stored in the memory 24. Each target surface shape data indicates a size and a position of each sub-area in the surface to be ground. Each position data is represented by a rotation angle θ of the rotary table 2 and a swing angle ø of the air spindle 12, and each sub-area is prepared in a lattice form for everyone pulse of the rotary encoder 6 in the main axis direction and one step of the air spindle 12 in the sub-scanning direction.

The position in the main axis direction of a sub-area of the ground surface of the workpiece 1 is measured by counting the number of pulses output from the rotary encoder 6 using the CPU 23, that is, the position in the main axis direction of a sub-area is accurately measured by detecting the rotation angle θ of the rotary table 2. The position in the sub-scanning direction of a sub-area of the ground surface on the workpiece 1 is accurately measured by counting the number of pulses input to the pulse motor 22, that is, by detecting the swing angle ø of the air spindle 12. Thus, the CPU 23 identifies the position of a sub-area to be ground, based on the rotation angle θ, as detected by the rotary encoder, of the rotary table 2, and the swing angle ø of the air spindle 12, and reads out target surface shape data corresponding to the position of the identified sub-area from the memory 24. Successively, the CPU 23 feeds a voltage corresponding to the target surface shape data of the identified sub-area to the first piezo-electric element 10, and the grinding surface of the grinder 13 is biased into contact with the identified sub-area by moving the rectilinear table 7 in the X direction by deformation of the piezo-electric element 10. The above-mentioned process is continuously executed for each sub-area in the main axis direction and the sub-scanning direction. When the grinding surface of the grinder 13 reaches the top of the workpiece 1, processing of the ground surface of the workpiece 1 is completed. Thus, an asymmetric and aspherical surface having a radius of curvature in the sub-scanning axis direction which changes depending on the position, that is, a deformed toroidal surface, is obtained.

If the workpiece 1 which has been once processed is again processed in order to correct the ground surface more accurately, the size of the processed workpiece 1 on the rotation table 2 is further accurately measured by the shape measurement unit 25 at a stopping state of the rotary table 7. Measured sizes of all sub-areas in the main axis direction and the sub-scanning direction are input to the CPU 23. The CPU 23 calculates deviations of the measured sizes of the sub-areas from the target size data of the sub-areas stored in the memory 24, and the ground surface of the workpiece 1 is again processed based on the calculated deviations, so that the accuracy can be improved. In the embodiment, the shape of the ground surface of the workpiece 1 is measured by a separately provided measurement unit 25. However, it is also possible to estimate the shape of a ground surface of the workpiece 1 based on a rotation amount (θ) of the rotary table 2, a swing amount (ø) of the support arm and a position (X) of said rectilinear motion table 7.

Although the spindle supporting shaft 14 is supported by a highly accurate rolling bearing 15 so as to suppress an axis deflection, as shown in FIG. 1a, in the present apparatus for producing an object having an asymmetrical and aspherical surface, a slight axis deflection still occurs. Accordingly, in the present apparatus for producing an object having an asymmetrical and aspherical surface, the axis deflection of the spindle supporting shaft 14 is detected by the second capacitance type displacement detector 20 provided opposite to a circular arc shaped surface of the projecting part 16 a of the support arm 16. The voltage output from the displacement detector 20 is fed to the second piezo-electric element 21, and the axis deflection due to movement of the spindle supporting shaft 14 is further suppressed by slightly displacing the spindle supporting shaft 14 by generating a deformation of the second piezo-electric element 21.

The workpiece 1 and the grinder 13 are positioned by adjusting the distance between the spindle shaft 12a and the spindle supporting shaft 14, since the air spindle 12 can be slightly moved on the support arm 16. Even if the radius r' of the grinder 13 is reduced by dressing, since R−r=1, and 1 is constant, the relation, R−r=1, can be maintained by positioning the rotary table 2 at a place spaced from the rotation central axis C of the spindle supporting shaft 14 by a distance 1. This can be done by projecting a master gauge of a length R from the above-mentioned place in the direction of the grinder 13, and by causing the grinder to contact the master gauge by slightly moving the air spindle 12 on the spindle supporting shaft 14.

Figure 4:
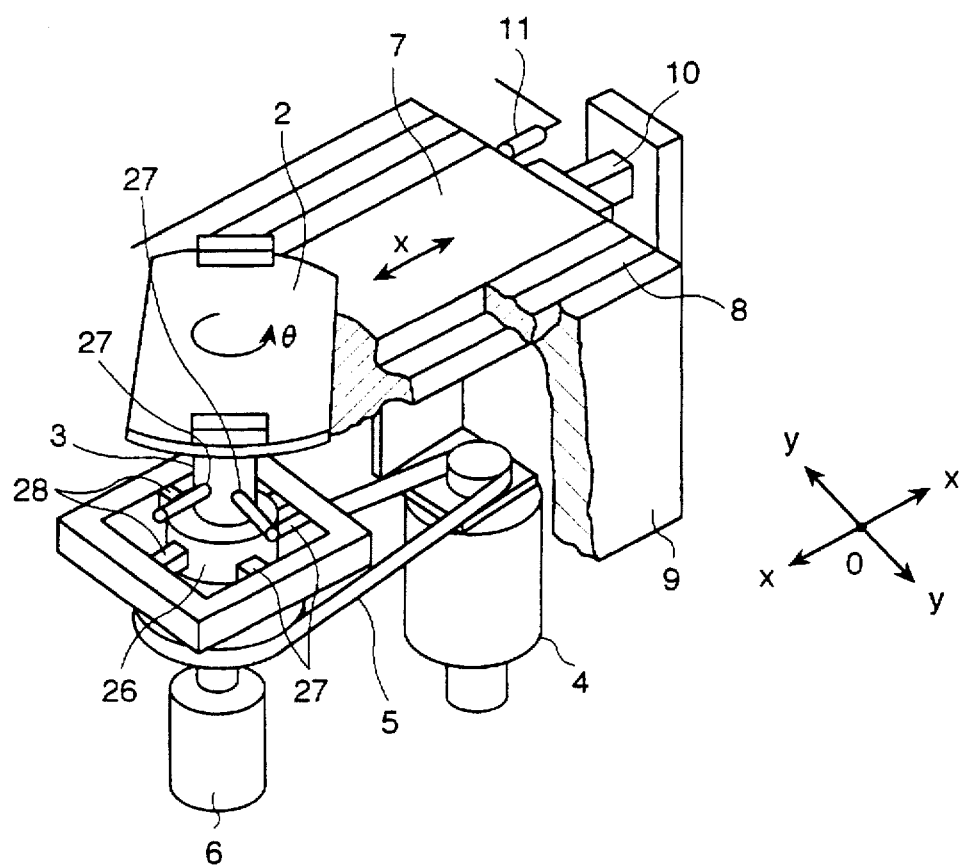
FIG. 4 is a perspective view showing an apparatus including an axis deflection suppressing mechanism at a rotating state of a rotation axis, provided at a rotation shaft of the rotary table in the embodiment shown in FIGS. 1a and 1b.

FIG. 4 is a perspective view showing an axis deflection suppressing mechanism provided at the rotation shaft of the rotary table 2 in the embodiment shown in FIGS. 1a and 1b.

In FIG. 4, the axis deflection suppressing mechanism is composed a rolling bearing 26, two pairs of third piezo-electric elements (actuators), and two third capacitance type displacement detectors 28. The same elements as shown in FIG. 1b are indicated by the same reference numerals.

The rotation shaft 3 of the rotary table 2 is supported by a pair of the third piezo-electric elements 27 arranged in the X direction and the Y direction, as shown in FIG. 4, respectively, via the rolling bearing 26. The two third capacitance type displacement detectors 28 are arranged opposite to the rotation shaft 3 in the X direction and Y direction, respectively, shown in FIG. 4.

The third capacitance type displacement detectors 28, arranged opposite to the rotation shaft 3, detect the axis deflections in the X direction and the Y direction of the rotation shaft 3 in a rotating state. A voltage corresponding to a displacement detected by one (for the X direction) of the third capacitance type displacement detectors 28 is applied to one pair (for the X direction) of the third piezo-electric elements 27, and a voltage corresponding to a displacement defected by the other one (for the Y direction) of the third capacitance type displacement detectors 28 is applied to the other pair (for the Y direction) of the third piezo-electric elements 27. Since each pair of the piezoelectric elements 27 are deformed by an amount corresponding to the displacement detected by each of the capacitance type displacement detectors 28, the axis deflection of the rotation shaft 3 in a rotating state can be effectively suppressed so that only a slight deflection of the axis is generated.

Figure 5:
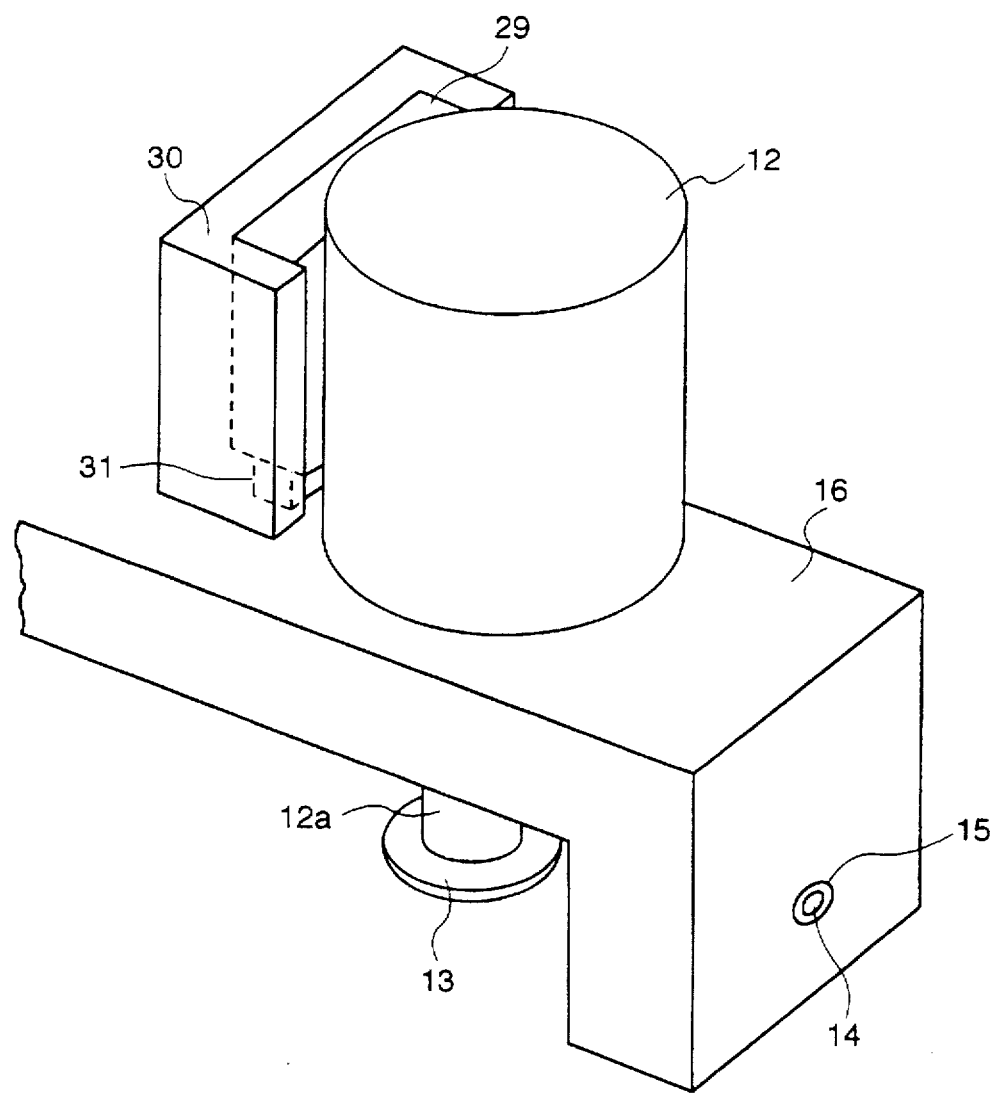
FIG. 5 is a perspective view showing an apparatus including an initial vertical position adjusting mechanism for slightly adjusting height of an air spindle, namely, a grinder, which is provided in the embodiment shown in FIGS. 1a and 1b.

FIG. 5 is a perspective view showing the apparatus of the present invention, including an initial vertical position adjusting mechanism for slightly adjusting the height of the air spindle 12, namely, the grinder 13 in the embodiment shown in FIGS. 1a and 1b.

The vertical position adjusting mechanism is composed of a support member 29, a guide 30, and a fourth piezo-electric element 31 (actuator). The same elements as shown in FIG. 1a are indicated by the same reference numerals.

The air spindle 12 is held by the support member 29, and the support member 29 is attached to the rectilinear motion table 7. The guide 30 has a U-shaped cross-section, and the back of the guide 30 contacts the back and both sides of the support member 29, respectively. The fourth piezo-electric element 31 is inserted between the support member 29 and the support arm 16.

Figure 6:
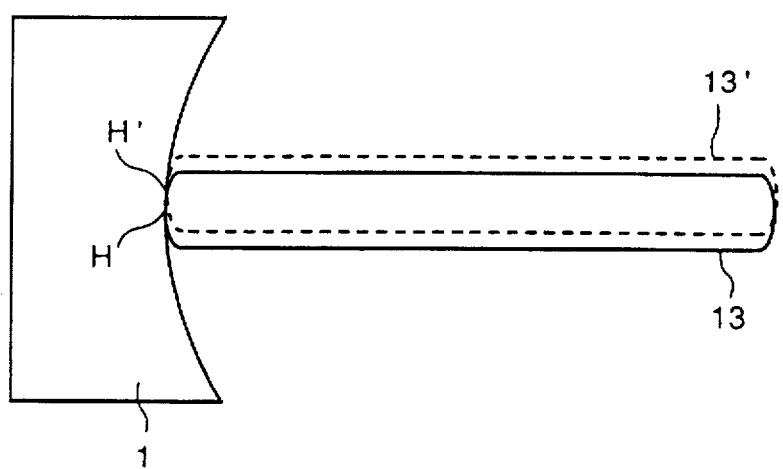
FIG. 6 is a diagram for explaining the case in which an attachment position slightly changes in exchanging a grinder attached at a spindle shaft of the air spindle.

FIG. 6 is a diagram for explaining the case in which the position of a newly attached grinder 13 slightly changes when exchanging the grinder 13 attached at a spindle shaft 12a of the air spindle 12.

In FIG. 6, numeral 13' indicates a newly attached grinder.

As seen in FIG. 5, when a voltage is applied to the fourth piezo-electric element 31, the fourth piezo-electric element 31 is deformed, and the interval between the support arm 16 and the support member 29 is adjusted by the deformation. At the same time, the vertical position (height) of the air spindle 12 from the support arm 16, that is, the vertical position (height) of the grinder 13 attached at the spindle shaft 12a is adjusted. The vertical attachment height of the grinder 13 can be adjusted by using the above-mentioned mechanism for adjusting the height of the grinder 13. As shown in FIG. 6, when exchanging the grinder 13 for a new grinder 13', the contact position between the grinding surface of the grinder 13 and the ground surface of the workpiece 1 possibly shifts from the low position H to the slightly higher position H'. If the grinding process is continued without correcting the contact position H', the shape of the ground surface in the sub-scanning direction will be changed, which considerably degrades the processing accuracy of the workpiece 1. Therefore, the above-mentioned height adjusting mechanism for the grinder 13 is indispensable for maintaining the high accuracy of the ground surface.

Figure 7:
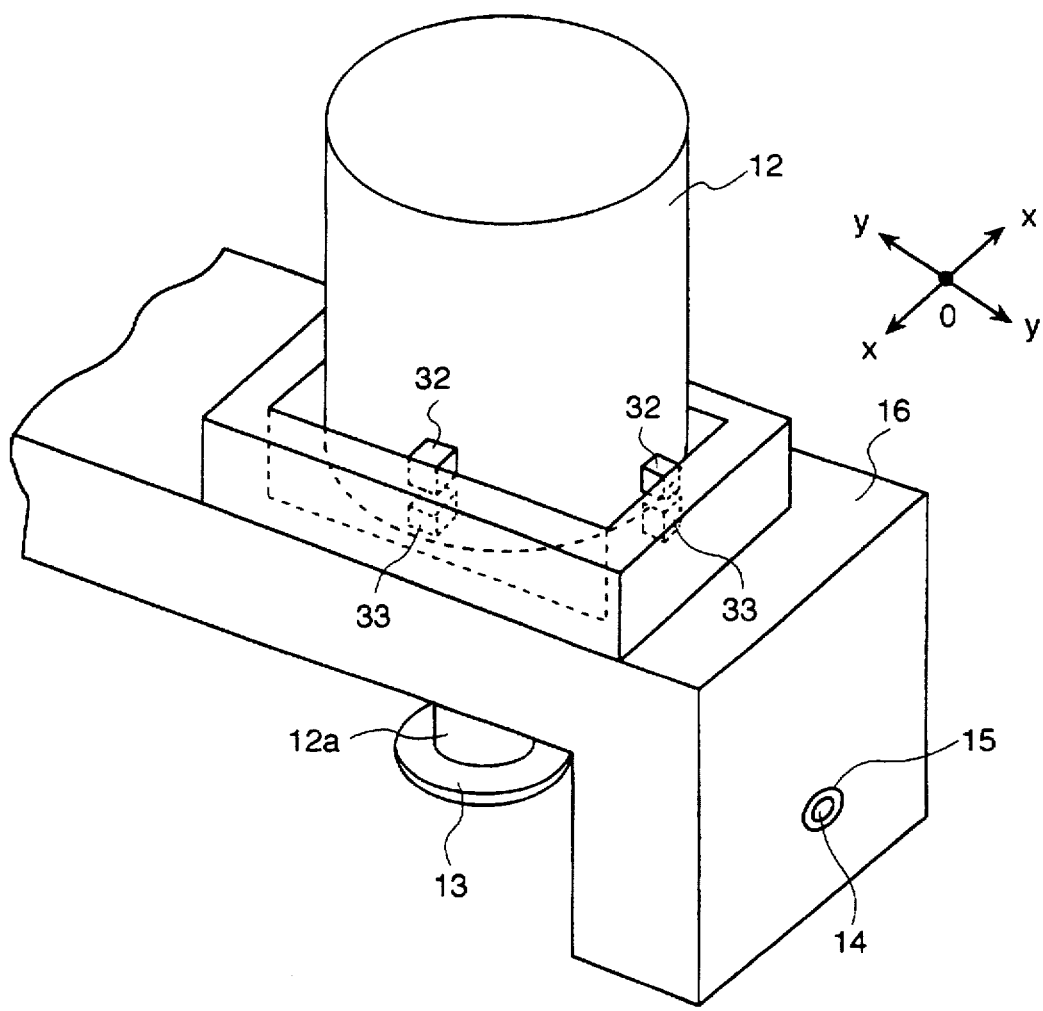
FIG. 7 is a perspective view showing an apparatus including a grinding force adjusting mechanism for slightly adjusting a horizontally applied grinding force of an air spindle, which is provided around the air spindle in the embodiment shown in FIGS. 1a and 1b.

FIG. 7 is a perspective view showing an apparatus including a grinding force adjusting mechanism for slightly adjusting the horizontally applied grinding force of the air spindle 12, which mechanism is provided around the air spindle 12 in the embodiment shown in FIGS. 1a and 1b.

As seen in FIG. 7, the grinding force adjustment mechanism is composed of two pairs of fifth piezo-electric elements 32 (actuators) and two pairs of sixth piezo-electric elements 33. The same elements as shown in FIG. 1a are indicated by the same reference numerals.

The air spindle 12 is held by the pairs of fifth piezo-electric elements 32 arranged in the X direction and the Y direction, and is further held by the pairs of sixth piezo-electric elements 33 arranged in the X direction and the Y direction.

Figure 8:
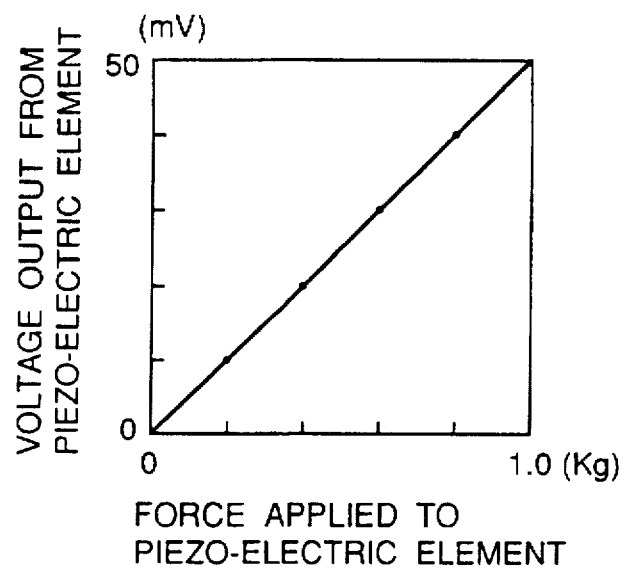
FIG. 8 is a diagram which shows a relation between a force applied to a piezo-electric element and a voltage output from the piezo-electric element.

FIG. 8 shows a relation between the force applied to a piezo-electric element and the voltage output from the piezoelectric element.

In FIG. 8, the abscissa indicates a force, expressed by a unit of Kg, applied to a piezo-electric element, and the ordinate indicates a voltage, expressed by a unit of mV, output from the piezo-electric element in response to the applied force.

As shown in FIG. 8, since the relation between the force applied to a piezo-electric element and the voltage output from the piezo-electric element is represented by a linear characteristic, the force applied to the piezo-electric element is estimated by detecting the voltage output from the piezo-electric element. Thus, two components of force which are applied to a pair of the fifth piezo-electric elements 32 in the X direction and to another pair of the fifth piezo-electric elements 32 in the Y direction by the air spindle 12, respectively, that is, the grinding force applied to the workpiece 1 in the grinding process, are detected by those fifth piezo-electric elements. The CPU 23 compares the voltages output from the fifth piezo-electric elements 32 with a demanded voltage for a grinding force at a present sub-area, and sends such voltages to a pair of the sixth piezo-electric elements 33 (in the X direction) and to another pair of the sixth piezo-electric elements 32 (in the Y direction) so that a difference between the detected voltages and the demanded voltage converges to 0. In the above-mentioned element arrangement for the grinding force adjustment mechanism, since the pair of the sixth piezo-electric elements 33 (in the X direction) and the other pair of the sixth piezo-electric elements 33 (in the Y direction) are deformed corresponding to the supplied voltages, fluctuations of the grinding force applied to the ground surface of the workpiece 1 can be considerably suppressed. Thus, since the grinding force is controlled to be almost constant by using this feature of the present invention, generation of vibrations in the apparatus or elastic deformations of the workpiece 1 can be suppressed, which provides a highly accurate process of grinding the workpiece 1.

Figure 9:
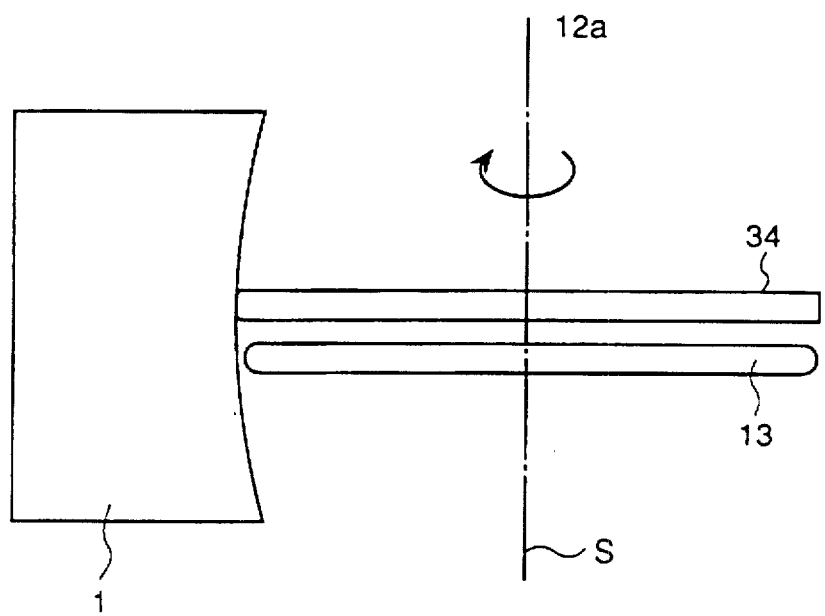
FIG. 9 is a diagram which shows a composition of an apparatus in which a polisher is provided in parallel to the grinder in the embodiment shown in FIGS. 1a and 1b.

FIG. 9 shows an arrangement in which a polisher is provided in parallel to the grinder 13 in the embodiment shown in FIG. 1a.

In FIG. 9, numeral 34 indicates a polisher. The same elements as shown in FIG. 1a are indicated by the same reference numerals.

Further, the polisher 34 is attached to the spindle shaft 12a of the air spindle 12 in parallel to the grinder 13. The polisher 34 is made of fibrous material, such as felt, synthetic resin, such as teflon, which may be used depending on the material forming the workpiece 1, soft metal, such as tin, and so forth.

Generally, an apparatus for grinding an object has a means for adjusting a vertical attachment position (height) of a grinder. When the workpiece 1 is polished by the polisher 34, the air spindle 12 is vertically lifted, and the workpiece 1 is polished by causing the polisher 34 to contact the ground surface of the workpiece 1. Further, the polishing process is carried out while injecting a polishing fluid, which includes free abrasive powder, such as diamond paste, onto a part of the workpiece being polished.

As mentioned above, by using the apparatus for producing an object having an asymmetrical and aspherical surface, according to the present invention, it is possible to make an aspherical surface of a desired shape. Further, the accuracy in the sizes of the once ground surface of the workpiece 1 can be further improved by the following process. At first, the sizes of the surface of the workpiece 1, on which a first grinding operation is finished, are more accurately measured while the workpiece 1 on the rotary table 2 is stopped, and deviations of the measured sizes from the sizes of the stored target size data is obtained by the CPU. Next, based on the deviations, the surface to be ground is again ground and polished.

The present invention is applicable to a workpiece, such as an object made of an optical lens material, or a metal die used for a molding process of a optical lens.

Thus, by using the present invention, it becomes possible to process a surface of a workpiece to be ground to a deformed toroidal surface deviating from a toroidal surface, that is, an asymmetrical and aspherical concave surface. Further, it becomes also possible to mass-produce objects having an aspherical surface with a high size accuracy.

What is claimed is:

1. An apparatus for producing an object having an aspherical surface, comprising:

a rotary mechanism on which a workpiece is attached on a peripheral part of a rotary member rotating on a rotation shaft;

a rectilinear motion mechanism for moving said rotary mechanism in one direction;

a grinding mechanism for grinding a surface of said workpiece with a grinding part supported by a spindle movable in a sub-scanning direction of said workpiece to contact said workpiece;

a swing mechanism for swinging said grinding part together with said spindle in a circular arc in said sub-scanning direction of said workpiece;

data storage means for storing data which prescribes a target surface shape of said workpiece;

shape measurement means for measuring a surface shape of said workpiece attached to said rotary member of said rotary mechanism, wherein said shape measurement means estimates a ground surface of said workpiece, based on a rotation angle of said rotary mechanism, a swing angle of said swing mechanism and a horizontal position of said rectilinear motion mechanism; and control means for controlling said above-described mechanisms, data storage means and shape measurement means by comparing data of said surface shape of said workpiece which is being ground, as measured by said shape measurement means, with said data stored in said date storage means which prescribes said target surface shape of said workpiece, and by controlling grinding processing of said surface of said workpiece based on results of said comparing, so that a difference between said data of said measured surface shape of said workpiece and said data of said target shape converges toward zero.

2. An apparatus according to claim 1, wherein said control means compares said measured shape and said target shape of said ground surface of said workpiece, for each of a plurality of sub-areas of the workpiece surface by dividing said surface into a plurality of cells in said main axis direction and said sub-scanning direction of said workpiece.

3. An apparatus according to claim 1 or 2, wherein said shape measurement means is a sensor capable of measuring a three-dimensional surface shape of an object.

4. An apparatus according to claim 1 or 2, wherein said grinding mechanism is a grinder.

5. An apparatus according to claim 1 or 2, wherein said swing mechanism includes a shaft deflection suppressing mechanism for suppressing shaft deflections of said spindle supporting shaft, including a plurality of piezoelectric elements arranged opposite to a support member for rotatably holding said spindle supporting shaft at a position in response to signals output from a plurality of displacement detectors arranged on opposite sides of said spindle supporting shaft.

6. An apparatus according to claim 1 or 2, wherein said rotary mechanism includes a shaft deflection suppressing mechanism for suppressing shaft deflections of said rotation shaft, including a plurality of piezoelectric elements attached at a rolling bearing part of said rotation shaft to maintain said rotation shaft at a position in response to signals output from a plurality of displacement defectors arranged on opposite sides of said rotation shaft.

7. An apparatus according to claim 1 or 2, wherein said spindle of said grinding mechanism is arranged between said workpiece at the grinding position and said rotation shaft of said rotary mechanism.

8. An apparatus according to claim 1 or 2, wherein said grinding mechanism includes an initial spindle position adjusting mechanism for adjusting an initial vertical position of said spindle, including a piezo-electric element provided between a support arm attached to said spindle supporting shaft and a hold member for holding said spindle on said support arm to said spindle to a position in response to a voltage corresponding to a displacement to be adjusted.

9. An apparatus according to claim 1 or 2, wherein said grinding mechanism includes a grinding force adjusting mechanism for keeping a grinding force of said grinding part constant, including a group of piezo-electric elements in contact with said spindle and responsive to signals corresponding to voltages generated in a first group of piezo-electric elements supported by a holding part provided on said support arm and in contact with said spindle.

10. An apparatus according to claim 1 or 2, wherein said grinding mechanism includes a polisher, so that a surface of said workpiece to be ground is ground with said grinding part of said grinding mechanism, and then, polished with said polisher provided in parallel to said grinding part.

11. Working apparatus according to claim 1 or 2, wherein said workpiece is an object made of a material used for an optical lens.

12. A apparatus according to claim 1 or 2, wherein said workpiece is an object made of a material used for making an optical lens.

13. A method of producing an object having an aspherical surface, by using an apparatus having a rotary mechanism on which a workpiece is attached on a peripheral part of a rotary member rotating on a rotation shaft, a rectilinear motion mechanism for moving said rotary mechanism in one direction, a grinding mechanism for grinding a surface of said workpiece with a grinding part supported by a spindle movable in a sub-scanning direction of said workpiece to contact said workpiece, a swing mechanism for swinging said grinding part together with said spindle in a circular arc in the sub-scanning direction of said workpiece, said method comprising the steps of:

storing data which prescribes a target shape of said workpiece in data storage means;

measuring a shape of said workpiece attached to said rotary member of said rotary mechanism by using shape measurement means including estimating a ground surface of said workpiece, based on a rotation angle of said rotary mechanism, a swing angle of said swing mechanism and a horizontal position of said rectilinear motion mechanism;

comparing data of a surface shape of said workpiece which is being ground, as measured by said shape measurement means, with said data stored in said date storage means which prescribes said target surface shape of said workpiece; and controlling said above-described mechanisms, data storage means and shape measurement means to grind said surface of said workpiece, based on results of said comparing, so that a difference between said measured surface shape of said workpiece and said target surface shape prescribed by said stored data converges toward zero.

14. A method of producing an object having an aspherical surface, according to claim 13, wherein, at the step of comparing, said measured surface shape and said target surface shape of said workpiece are compared for each of a plurality of sub-areas set by dividing said ground surface into a plurality of cells in a main axis direction and a sub-scanning direction.

15. An article having an aspherical surface produced by a method according claim 13 or 14.

* * * * *